United States Patent [19]

Appl

[11] Patent Number: 4,651,787
[45] Date of Patent: Mar. 24, 1987

[54] METHOD AND APPARATUS FOR EFFECTUATING A BLOWOUT

[76] Inventor: Franklin J. Appl, 3503 Charleston Rd., Norman, Okla. 73069

[21] Appl. No.: 812,649

[22] Filed: Dec. 23, 1985

[51] Int. Cl.⁴ .............................................. B65B 3/04
[52] U.S. Cl. .......................................... 141/1; 141/65; 82/46; 157/13
[58] Field of Search ................ 82/4 R, 46, 82, 57; 157/13; 141/65, 66, 1–12

[56] References Cited

U.S. PATENT DOCUMENTS

| | | | |
|---|---|---|---|
| 1,115,978 | 11/1914 | Schweinert et al. | 152/415 |
| 2,099,642 | 11/1937 | Overturf | 35/49 |
| 2,289,072 | 7/1942 | Ross | 152/416 |
| 3,003,539 | 10/1961 | Tone | 152/415 |
| 3,361,180 | 1/1968 | Neilson et al. | 152/415 |
| 3,362,452 | 1/1968 | Harnish | 152/416 |
| 3,443,546 | 5/1969 | Couey | 116/81 |
| 3,532,140 | 10/1970 | Hoffman | 141/65 |
| 3,733,941 | 5/1973 | Geyer, Jr. | 157/13 |
| 3,818,755 | 6/1974 | Edwards et al. | 73/146 |
| 3,838,717 | 10/1974 | Wolf | 141/65 |
| 3,885,292 | 5/1975 | Sharp et al. | 157/13 |

*Primary Examiner*—Houston S. Bell, Jr.
*Attorney, Agent, or Firm*—Laney, Dougherty, Hessin & Beavers

[57] ABSTRACT

A method and apparatus for effectuating a blowout of a tire of a vehicle is provided. A power ram is used to press a cutting member against the tire as the tire rotates relative thereto in order to circularly slice the tire open. A control valve is utilized to activate the ram.

32 Claims, 7 Drawing Figures

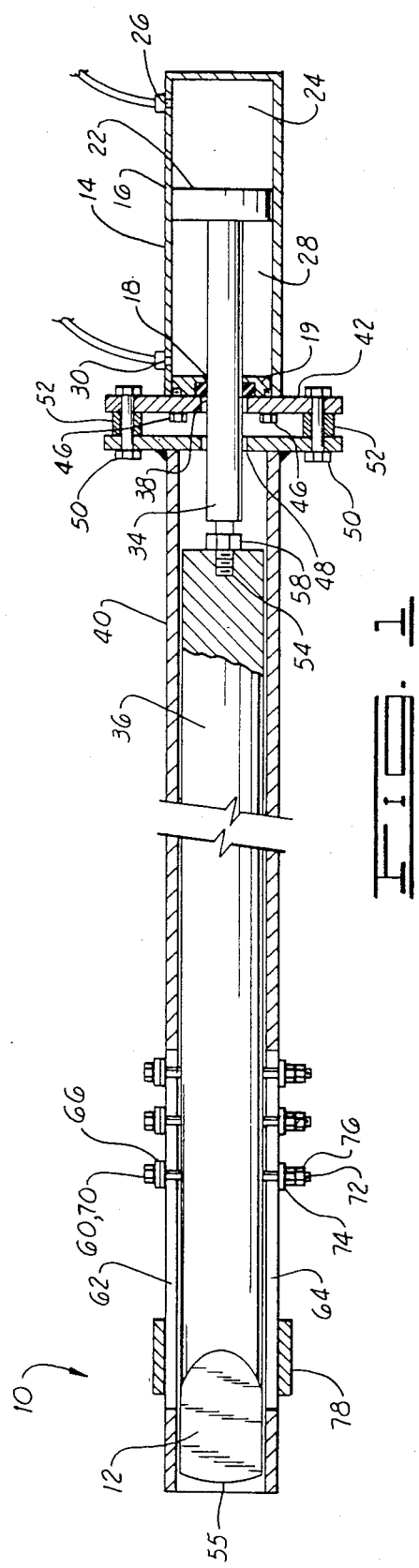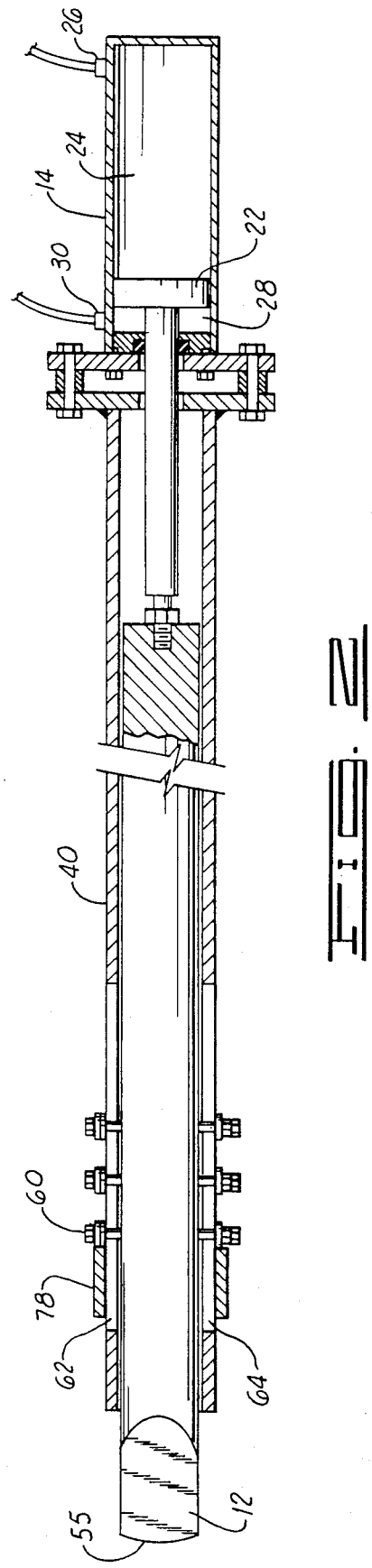

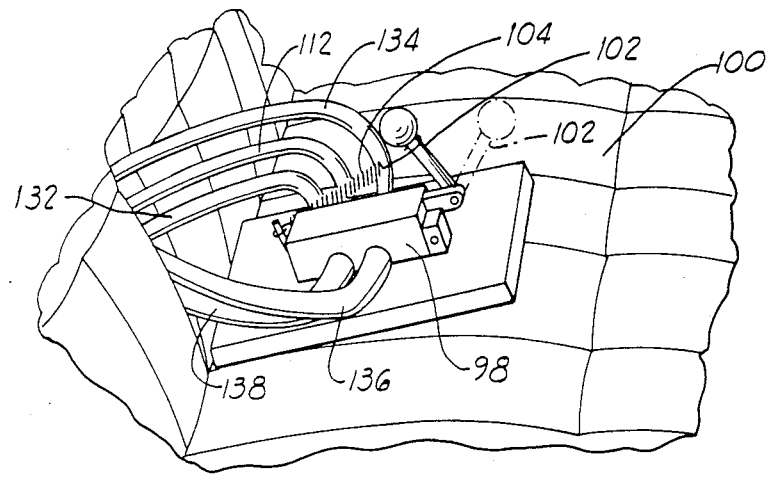
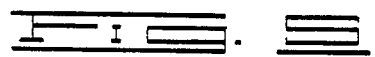
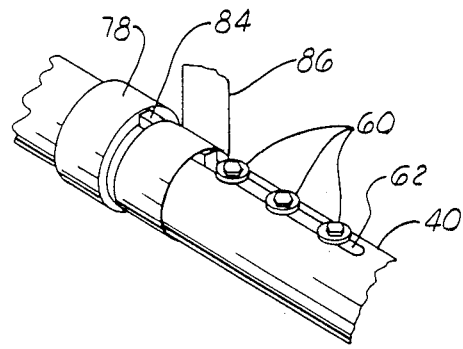
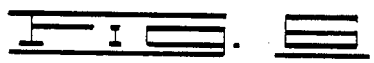
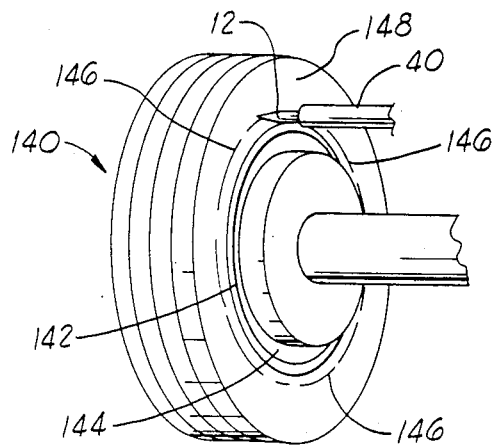
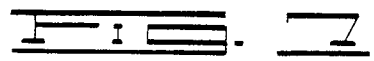

METHOD AND APPARATUS FOR EFFECTUATING A BLOWOUT

BACKGROUND OF THE INVENTION

1. Field of the Invention

This invention relates to a method and apparatus for reconstructing vehicular accidents and analyzing vehicular behavior, and more particularly, but not by way of limitation, to a method and apparatus for effectuating a blowout of a tire of a vehicle.

2. Description of the Prior Art

The primary source of transportation in today's society is the automobile. Unfortunately, automobile accidents account for a large proportion of the total number of accidents involving death or serious bodily injury in this country. Consequently, many resources are expended in order to determine the causes of various accidents and to find new ways to eliminate or reduce the severity of automobile accidents in general.

Pneunmatic tire blowouts are sometimes the cause of automobile and other vehicular accidents. A blowout is a sudden, violent and uncontrollable escape of air from the tire while the automobile or other vehicle is in operation. Although there are many causes, blowouts sometimes occur when the wall of a tire becomes worn and weak and the internal pressure thereon causes the weak portions to burst or open up. It is often necessary to intentionally effectuate actual tire blowouts in order to study the effects of blowouts on vehicular behavior and to reconstruct certain accidents involving tire blowouts so that disputes concerning the nature and extent of the alleged damage and injury caused thereby can be resolved.

Numerous devices and methods for simulating and effectuating pneumatic tire blowouts have been developed.

Many of these devices produce a controlled air out or tire deflation by causing the release of air through the valve or some other orifice, which allows the tire to be reused. See, for example, U.S. Pat. No. 3,532,140 to Hoffman, and U.S. Pat. No. 3,838,717 to Wolf.

With some devices, a hole is preformed in the tire and plugged until the desired moment, at which time the plug is released or removed to cause the deflation. See. U.S. Pat. No. 3,818,755 to Edwards et al.

It has also been suggested that blowouts could be effectuated by plunging a knife into the tire, or by shooting a hole in the tire with a gun that has been mounted on the fender of the vehicle. See U.S. Pat No. 2,099,642, first column, lines 17-24.

The behavior and handling characteristics of a vehicle immediately following a true blowout vary greatly according to the amount of time that it takes for the air to exit from the tire. with a true and violent blowout, a very large opening is formed in the tire in a very short period of time resulting in an almost immediate deflation. Thus, in order to intentionally effectuate a blowout that closely resembles a true and violent blowout, a very large air exit hole must be formed in the tire in a very short period of time.

In many of the prior methods and devices for simulating the effectuating tire blowouts, the air is released through an orifice or other small opening in the tire. As a result, the amount of time that it takes for the air to exit from the tire is greater than it would be with a true and violent blowout.

Furthermore, plunging a knife or similar object completely into the tire can cause the tire to stop rotating and lock up. This has an additional effect on the behavior and handling characteristics of the vehicle which prevents an accurate determination of the actual effects of a true blowout.

Thus, there is a need for an apparatus and method for effectuating a blowout that forms a very large opening in the tire in a very short period of time without stopping the rotation thereof.

SUMMARY OF THE INVENTION

The present invention provides a method and apparatus for effectuating a pneumatic tire blowout. An energizing means is used to press a cutting member against the tire as the tire rotates relative thereto in order to circularly slice the tire open. The sidewall of the tire is gradually sliced as the tire rotates, and ultimately a major portion of the sidewall blows out to form a very large opening therein in a very short period of time. By creating a very large opening in a very short period of time, the air exits the tire almost immediately. Since the cutting member is not immediately plunged into the tire, it does not cause the tire to stop rotating and lock up. Thus, a true and violent blowout is effectuated.

A power ram is utilized to press the cutting member against the tire. A control valve is located within the vehicle and is used to activate the ram.

From the foregoing description of the present invention, it will be apparent that an important object of the invention is to provide a method and apparatus for effectuating a blowout that creates a very large opening in the tire in a very short period of time without preventing the rotation of the tire.

Numerous other objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a side elevational view of the preferred embodiment of the present invention with the cutting member retracted.

FIG. 2 is a side elevational view of the apparatus shown in FIG. 1 with the cutting member extended.

FIG. 5 is a view of a control valve disposed in the front seat of the automobile.

FIG. 6 shows the adjustable stop means of the present invention with a bar taped between the collar and the transverse strut to lock the cutting member in a retracted position.

FIG. 7 shows the orientation of the cutting member with respect to the tire and shows the circular contact line on which the tire is sliced.

DETAILED DESCRIPTION OF THE PREFERRED EMBODIMENTS

Figure 3:
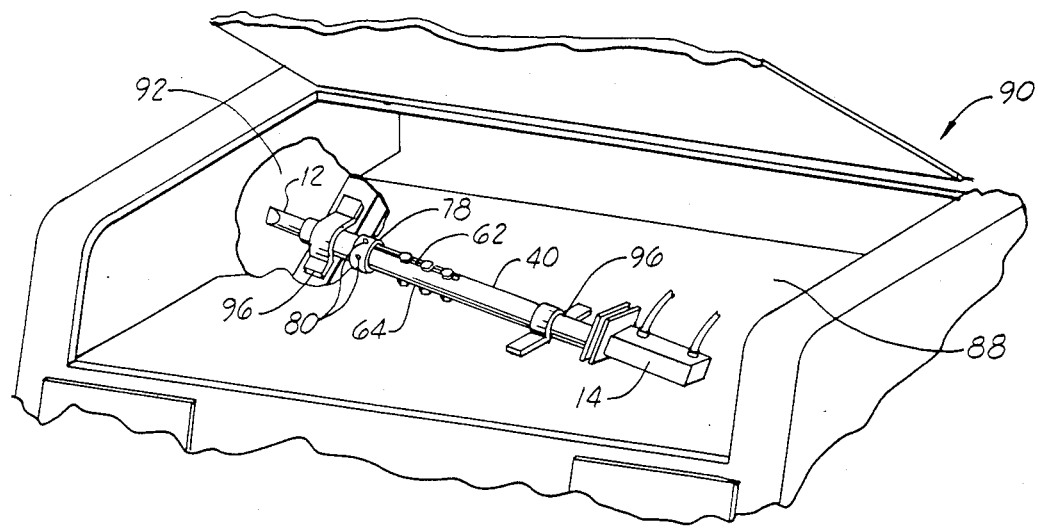
FIG. 3 shows the apparatus of FIGS. 1 and 2 mounted in the trunk of an automobile.

Referring now to the drawings and particularly to FIG. 1, the apparatus of the present invention, generally designated by the numeral 10, is illustrated in part. The apparatus includes a pneumatic ram 14 and a cutting member 12.

The pneumatic ram 14 includes a cylinder 16 that has an opening 18 in wall 19 thereof. A piston 22 is reciprocably disposed within the cylinder 18. A connecting rod 34 extends outwardly from the piston 22 through a seal 38 in the opening 18 of end wall 19.

The connecting rod 34 is connected to an elongated shaft 36. The cutting member 12 is disposed on the outer end of the shaft 36.

A cylindrical shaft housing 40 extends outwardly from the ram 14 and receives the elongated shaft 36. The cylindrical housing 40 also receives the cutting member 12 when the cutting member 12 is retracted therein.

The power ram 14 is attached to a first mounting plate 42 with a plurality of threaded bolts 46. A second mounting plate 48 is welded to the end of the cylindrical housing 40. The cylindrical housing 40 is attached to the ram 14 by connecting the first mounting plate 42 to the second mounting plate 48 with a plurality of bolts 50. A plurality of spacers 52 surround the bolts 50 in order to provide space between the first mounting plate 42 and the second mounting plate 48 for the heads of the threaded bolts 46.

The elongated shaft 36 is threaded on to a threaded end 54 of the connecting rod 34 for attachment thereto. A lock nut 58 is tightly screwed against the end of the shaft 36 to lock the threaded end 54 of the connecting rod 34 therein.

In the preferred embodiment of the present invention, the cutting member 12 is an integral part of the shaft 36. The shaft 36 is formed from a solid round bar of 4340 steel. The cutting member 12 is formed by machining the outer end of the shaft 36 into a V shape. A grinder is then used to shape the cutting edge 55 of cutting member 12. Care must be taken not to overheat the steel so as to cause it to lose its inherent hardness. Alternatively, the cutting member 12 can be a separate part that is attached to the elongated shaft 36. It can take the form of a blade or any other structure that has a cutting edge.

As shown in FIG. 1, the cutting member 12 is completely received within the cylindrical housing 40 when it is retracted from the tire in order to prevent those who work on the vehicle or apparatus from being cut thereby. The cutting member 12 is shown extending from within the cylindrical housing 40 toward the tire 140 in FIGS. 2, 3 and 7.

In FIG. 7, the orientation of the cutting member 12 with respect to the tire 140 is illustrated. The cutting member 12 is oriented in a position with cutting edge 55 radially outward from and approximately parallel to the rim 142 of the wheel 144 of the automobile 90 so that it will slice the tire 140 on a circular contact line 146. The circular contact line 146 forms a circle above the rim 142 that is approximately concentric with the tire 140. Although the inner sidewall 148 of the tire 140 is opened in the preferred embodiment, the apparatus can be used to circularly slice the tire 140 at any point thereon.

The pneumatic ram 14 is double-acting so that it can be activated in a forward direction to extend the cutting member to the tire 140 and in a backward direction to retract the cutting member therefrom. The ram 14 is shown activated in a forward direction in FIG. 2. Air is forced through a rear air inlet/outlet 26 into the rear chamber 24 of the housing 16 to push the ram 14 forward. Air is forced through a front air inlet/outlet 30 into the front chamber 28 of the housing 16 to push the ram 14 backward. The ram 14 is shown activated in a backward direction in FIG. 1.

Figure 4:
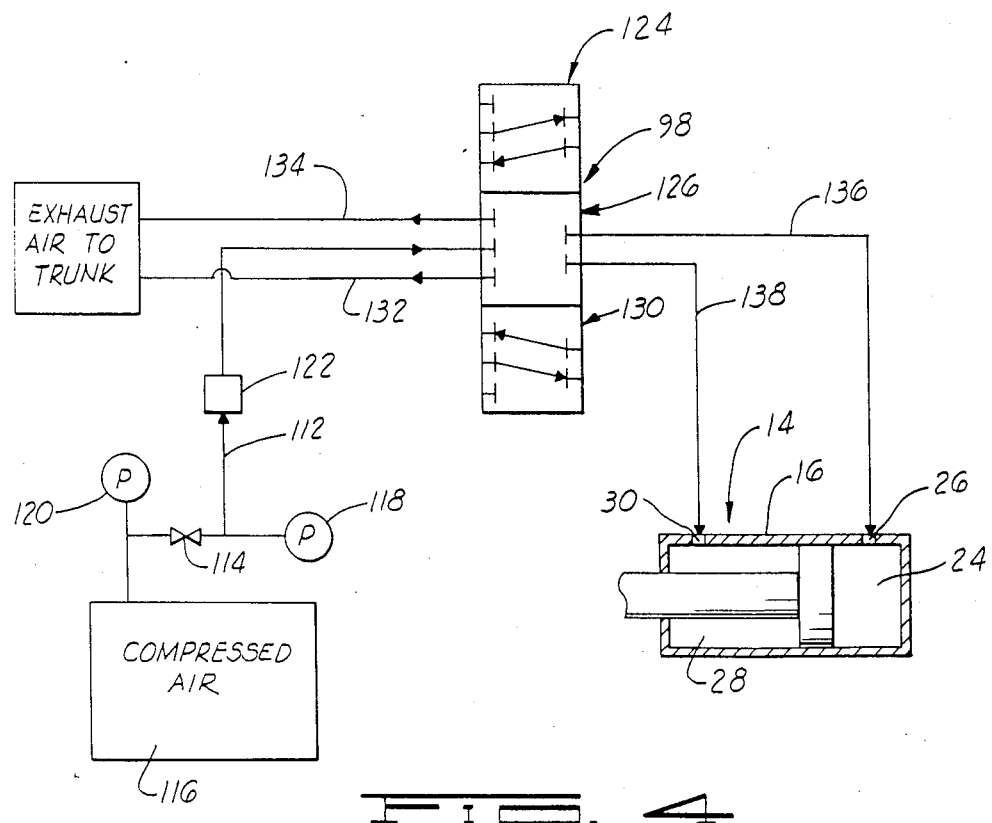
FIG. 4 is a schematic diagram illustrating the operation of the preferred embodiment of the present invention.

Air can be supplied to the ram from any source of pressurized air, preferably a compressed air tank. A compressed air tank 116 is schematically illustrated in FIG. 4. Although a pneumatic ram is preferred, any type of energizing means can be used to press the cutting member 12 against the tire 140.

The cylindrical housing 40 is a two-inch nominal diameter heavy wall steel pipe. The shaft 36 is one and five-eighths inches in diameter, and is closely received within the cylindrical housing 40. This provides a diametrical clearance in the range of about 1/32 inch to 1/16 inch between shaft 36 and housing 40. The close fit is necessary to assure a sharp cut in the tire 140. If the cutting member 12 is allowed to wiggle back and forth as the tire 140 rotates relative thereto, the tire 140 will be shredded as opposed to sliced which will adversely affect the handling characteristics of the car after the blowout.

Referring now to FIGS. 1–3 and 6, a plurality of transversely oriented struts or bolts 60 extend through the shaft 36 and through first and second diametrically opposed longitudinal slots 62 and 64 in the cylindrical housing 40.

Each bolt 60 has a pair of washers 66 on the head end 70 thereof. A washer 74 and a pair of locking nuts 76 are disposed on the threaded end 72 of the bolts 60.

The locking nuts 76 are locked together on the end of the bolts 60 leaving enough space for the washers 66 and 74 to loosely engage the outer sides of the cylindrical housing 40. The bolts 60 slide within the slots 62 and 64 of the cylindrical housing 40 forward and backward with the shaft 36 and the cutting member 12 as the power ram 14 is activated in forward and backward directions respectively.

A locking collar 78 is slidably disposed around the cylindrical housing 40. The collar 78 is locked in place on the cylindrical housing 40 by tightening a plurality of set screws 80 (see FIG. 3) that are countersunk within the collar 78. The locking collar 78 is used in association with the struts or bolts 60 to provide an adjustable stop means for varying the maximum distance that the cutting member 12 can extend from within the cylindrical housing 40 when the ram 14 is activated in a forward direction. The locking collar 78 is locked on the cylindrical housing 40 at the desired distance from the outer end thereof. When the ram 14 is activated in a forward direction, the struts or bolts 60 move forward within the slots 62 and 64 with the shaft 36 until the outermost bolt 60 abuts against the collar 78 and prevents the cutting member 12 from extending any further outward from the cylindrical housing 40.

The adjustable collar 78 can also be used as a lock means to prevent the cutting member 12 from extending outward from the cylindrical housing 40 at all. It is sometimes desirable to lock the cutting member within the cylindrical housing while traveling in the vehicle to make sure the device is not inadvertently activated. To do so, the locking collar 78 is locked on the cylindrical housing 40 in a position directly adjacent the outermost bolt 60 when the cutting member 12 is fully retracted within the cylindrical housing 40.

The problem with using the locking collar 78 as a means to lock the cutting member 12 in the cylindrical housing 40 is that it will have to be relocked at the desired distance from the outer end of the cylindrical housing 40 every time the apparatus is to be used to effectuate a blowout. As shown in FIG. 6, this inconvenience can be avoided by inserting a bar 84 within either the first slot 62 or the second slot 64 between the locking collar 78 and the outermost bolt 60. Tape 86 can be wrapped around the cylindrical housing 40 with the bar inserted in place in order to hold it therein. Thus bar 84 will lock the cutting member 12 in a retracted position, while the collar 78 remains in a desired position to control the distance cutting member 12 will extend from housing 40.

As shown in FIGS. 3 and 7, the apparatus 10 is disposed within the trunk 88 of an automobile 90. The cutting member 12 extends through a hole 92 in the left rear wheel well of the automobile 90 toward the tire 140. Mounting brackets 96 are used to secure the apparatus 10 within the trunk 88. The compressed air tank 116, shown schematically in FIG. 4, can also be placed in the trunk 88.

As illustrated in FIGS. 4 and 5, a control valve 98 is used to activate the power ram 14. The control valve 98 is disposed in the front seal 100 of the automobile 90 so that it will be within the reach of the driver.

As schematically represented in FIG. 4, the control valve 98 has three positions. It has a forward position represented by block 124 for activating the ram 14 in the forward direction, a neutral position represented by block 126, and a reverse position represented by block 130 for activating the ram 14 in the backward direction.

A handle or control knob 102 is provided for manually switching the control valve 98 from one position to another. The handle 102 is moved to a forward position (shown in phantom lines in FIG. 5) to switch the control valve 98 to the forward position 124 and backward to the position shown in solid lines in FIG. 5 to switch the control valve to the reverse position 130.

The valve 98 can be switched to the neutral position by moving the handle 102 to a position between the forward position 108 and the backward position 106.

An automobile return means is provided to maintain the control valve 98 in the reverse position 130 when it is not manually held in the forward position 124. A spring 104 (see FIG. 5) extends from the handle 102 to the back of the control valve 98 in order to hold the handle 102 in the backward position when it is not manually held in the forward position. Any means can be used to hold the handle 102 in the reverse position. For example, a simple rubberband can be used in place of the spring 104.

FIG. 4 schematically illustrates the pneumatic circuit which directs air from the compressed air tank 116 to the power ram 14. A pressure supply line 112 extends from the compressed air tank 116 to the control valve 98. A shutoff valve 114 is provided. A pressure regulator 122 may be disposed in the pressure supply line 112 to regulate the amount of pressure that is put on the ram 14. A pair of pressure gauges 118 and 120 are also provided.

A pair of pressure exhaust lines 132 and 134 extend from the control valve 98 to the trunk 88 in order to exhaust the air to the atmosphere therein. Two pressure transfer lines 136 and 138 extend from the control valve 98 to the power ram 14 and direct the compressed air to the appropriate side of the piston 22. When the control valve 98 is put in the forward position 124 by moving the handle 102 to the forward position, the pressure supply line 112 communicates with the pressure transfer line 136. Air is directed through the rear air inlet/outlet 26 to the rear chamber 24 of the housing 16 to push the ram 14 in the forward direction. As the ram 14 is pushed forward, air is forced out of the front chamber 28 through the front air outlet/inlet 30 into the pressure transfer line 138 which communicates with the pressure exhaust line 132 in order to exhaust the air to the trunk.

Conversely, when the control valve 198 is put in the reverse position 130 by moving the handle 102 backward to the position 106, the pressure supply line 112 communicates with the pressure transfer line 138. Air is directed through the front air inlet/outlet 30 into the front chamber 28 of the housing 16 to push the ram 14 in the backward direction. As the ram is pushed backward, air is forced out of the rear chamber 24 through the rear air outlet/inlet 26 into the pressure transfer line 136 which communicates with the pressure exhaust line 134.

When the control valve 98 is put in the neutral position 126, the pressure supply line 112, both pressure exhaust lines 132 and 134, and the pressure transfer lines 136 and 138 are sealed so that there is no air flow through any of them. In FIG. 4, the control valve 98 is schematically illustrated in the neutral position 128. Actually, however, the control valve 98 is rarely maintained in the neutral position 126 due to the automatic return means or spring 104 which maintains the control valve 98 in the reverse position when it is not manually held in another position.

OPERATION OF THE PREFERRED EMBODIMENT

As shown in FIG. 3, the apparatus 10 is mounted in the trunk 88 of the automobile 90. A hole 92 is formed in the left rear wheel well so that the cutting member 12 can extend therethrough to the tire 140 when the power ram 14 is activated in a forward direction. The apparatus 10 is positioned in the trunk and mounted to leave approximately 3 inches between the outer end of the cutting member 12 and the tire 140 when the cutting member 12 is fully retracted within the cylindrical housing 40.

The locking collar 78 is locked on the cylindrical housing 40 at the desired distance from the outer end thereof. The locking collar 78 will be set according to the maximum distance that it is desired for the cutting member 12 to extend from the cylindrical housing 40. This distance will vary depending on the type of blowout that is to be effectuated, the tire, and the mounting position of the apparatus 10 in the trunk 88. The ram 14 is designed to have a stroke of approximately six inches. That stroke is reduced approximately by one inch in making the connection between the threaded end 54 of the connecting rod 34 and the shaft 36. Thus, with the apparatus mounted to leave approximately three inches between the outer end of the cutting member 12 and the tire 140 when the cutting member 12 is fully retracted, the cutting member 12 would extend a maximum distance of two inches into the tire if fully extended. The locking collar 78 should be adjusted so that the cutting member 12 will not extend any further into the tire than is necessary for the tire to open, usually about one inch.

After the apparatus 10 is set and the automobile 90 is in operation at the desired speed, the handle 102 of the control valve 98 is pushed forward to force the control valve 98 into the forward position 124, thereby activating the power ram 14 in a forward direction. The cutting member 12 extends outwardly from the cylindrical housing 40 until it frictionally engages the tire as the tire rotates relative thereto. The cutting member 12 is not fully extended when it first engages the tire 140 and is not immediately thrust therein. Rather, the cutting member 12 circularly slices the wall 148 of the tire 140 as the tire 140 rotates relative thereto and slowly extends therein. The tire wall 148 is gradually sliced until the internal pressure thereon forces it open along the circular contact line 146.

If the cutting member 12 were to be rapidly trust into the tire wall 148, it is possible to cause the tire to stop rotating and lock up, which is undesirable.

Depending on the pressure employed, the tire may rotate several times before the wall 148 is opened. The amount of time that it takes the cutting member 12 to circularly slice the tire open depends on the force exerted thereon by the ram 14. That force can be varied by regulating the pressure in the system. The pressure can be regulated either by adjusting the pressure regulator 122 or by directly varying the amount of pressure in the compressed air tank 116. The lower the pressure, the less force there will be to press the cutting member 12 against the tire and the longer it will take the cutting member 12 to slice the tire open. Typically, with approximately eighty pounds per square inch pressure in the system, the tire will make two or three revolutions before beginning to open and will make another one-half of a revolution or so before the wall 148 blows out. With a two-inch diameter piston 22, this provides a force of about 250 pounds.

Thus, the apparatus and method of the present invention provides a means for effectuating a blowout that creates a very large opening in the tire in a very short period of time without preventing the rotation thereof. The apparatus and method of this invention is well adapted, therefore, to carry out the objects and attain the ends and advantages mentioned as well as those inherent therein. While numerous changes in the construction and arrangement of parts will suggest themselves to those skilled in the art, such changes are encompassed within the spirit of this invention as defined in the pending claims.

What is claimed is:

1. Apparatus for effectuating a blowout of a tire of a vehicle while said vehicle is in motion, which comprises:
   a cutting member;
   an energizing means for pressing said cutting member against the tire as the tire rotates relative to the cutting member in order to circularly slice the tire open and effectuate the blowout; and
   mounting means for mounting said apparatus on said vehicle.

2. The apparatus as defined in claim 1, wherein said energizing means comprises:
   a power ram; and
   a power supply means for supplying power to said ram.

3. The apparatus as defined in claim 2, further comprising:
   an elongated shaft operationally associated with said ram; and
   wherein said cutting member is disposed on an outer end of said elongated shaft.

4. The apparatus as defined in claim 3, wherein said cutting member is an integral part of said elongated shaft.

5. The apparatus as defined in claim 3, wherein said ram is double-acting so that it can be activated in a forward direction to press said cutting member against the tire and in a backward direction to retract said cutting member therefrom.

6. The apparatus as defined in claim 5, further comprising a cylindrical housing extending outwardly from said ram toward the tire for receiving said elongated shaft and for receiving said cutting member when said cutting member is retracted from the tire.

7. The apparatus as defined in claim 5, further comprising a control valve means for activating said ram, said control valve means having a forward position for activating said ram in the forward direction and a reverse position for activating said ram in the backward direction.

8. The apparatus as defined in claim 7, wherein said control valve means is manually operated.

9. The apparatus as defined in claim 8, further comprising an automatic return means for maintaining said control valve in said reverse position when said control valve is not manually held in said forward position.

10. The apparatus as defined in claim 2, wherein:
    said ram is a fluid powered ram; and
    said power supply means includes a source of pressurized fluid.

11. The apparatus as defined in claim 10, further comprising a regulating means for regulating a force exerted on the tire by said cutting member so that an amount of time it takes said cutting member to slice the tire open and effectuate the blowout can be varied.

12. The apparatus as defined in claim 2, further comprising an adjustable stop means for varying a maximum distance that said cutting member can extend when said ram is activated in a forward direction.

13. The apparatus of claim 1, further comprising:
    an elongated shaft operably associated with said ram, said cutting member being disposed on an outer end of said shaft; and
    a cylindrical housing extending outwardly from said ram toward the tire for receiving said elongated shaft and for receiving said cutting member when said cutting member is retracted from the tire.

14. The apparatus as defined in claim 13, wherein said elongated shaft is closely received within said cylindrical housing.

15. The apparatus as defined in claim 14, wherein:
    said cylindrical housing comprises a two-inch nominal diameter heavy wall steel pipe; and
    said shaft is $1\frac{3}{8}$ inches in diameter.

16. The apparatus as defined in claim 13, wherein said cutting member is completely received within said cylindrical housing when said ram is not activated in a forward direction.

17. The apparatus as defined in claim 13, further comprising a lock means for preventing said cutting member from being extended in a forward direction.

18. The apparatus as defined in claim 13, further comprising an adjustable stop means for varying a maximum distance that said cutting member can extend from within said cylindrical housing when said ram is activated in a forward direction.

19. The apparatus as defined in claim 18, wherein:
    said cylindrical housing includes first and second diametrically opposed, longitudinal slots; and
    said adjustable stop means includes:
    a locking collar slidably disposed around said cylindrical housing, said collar being locked in place on said cylindrical housing at a desired distance from an outer end thereof; and a transverse strut operably associated with said elongated shaft and extending transversely therefrom through at least one of said slots of said cylindrical housing, said strut moving forward and backward within said slots with said shaft and said cutting member as said ram is activated in forward and backward directions, respectively, whereby said strut abuts said collar when said ram is activated in a forward direction to limit the distance that said cutting member can extend.

20. The apparatus as defined in claim 1, wherein said cutting member comprises a blade.

21. The apparatus as defined in claim 20, wherein said blade is oriented in a fixed position radially outward from and approximately parallel to a rim of a wheel of the tire so that it will slice the tire on a circular contact line that forms a circle above the rim that is approximately concentric with the tire.

22. Apparatus for effectuating an automobile tire blowout from within the automobile while the automobile is in operation, which comprises:
a cutting member;
a power ram for pressing said cutting member against the tire, said power ram comprising:
a housing having an opening at one end;
a piston disposed within said housing; and
a connecting rod having a portion thereof extending outwardly from said piston through said opening of said housing for operably connecting said ram with said cutting member;
a cylindrical housing extending outwardly from said ram for receiving the portion of said connecting rod that extends outwardly from said ram and for receiving said cutting member;
a means for supplying power to said ram; and
a control means for activating said ram from within the automobile at any desired location and time, whereby said ram is activated to press said cutting member against the tire as the tire rotates relative to the cutting member to effectuate the blowout.

23. An apparatus for causing a blowout of a rear tire of a vehicle, comprising:
a shaft slidably supported within a trunk of said vehicle and extending through an opening in a rear wheel well of said vehicle toward an inner sidewall of said tire, said shaft having a cutting member disposed on an outer end thereof so that said shaft provides a means for slidably supporting said cutting member from said vehicle; and
energizing means, located within said trunk and operably associated with an inner end of said shaft, for forcing said cutting member against said inner sidewall of said tire as said tire rotates relative to said cutting member.

24. An apparatus for causing a blowout of a tire of a vehicle, comprising:
an elongated hollow cylindrical housing mounted upon said vehicle and extending toward said tire;
an elongated shaft slidably received in said housing and having a cutting means disposed on a first end of said shaft closest to said tire so that said shaft provides means for slidably supporting said cutting member from said vehicle; and
energizing means for sliding said shaft within said housing and extending said cutting member out of said housing against said tire as said tire rotates relative to said cutting member to cut said tire thereby causing said blowout.

25. The apparatus of claim 24, wherein:
said housing and shaft are located and oriented so that said cutting member engages and cuts an inner sidewall of said tire.

26. The apparatus of claim 24, further comprising:
stop means, operably associated with said housing and said shaft, for limiting a distance by which said cutting member can extend from said housing.

27. The apparatus of claim 26, wherein:
said stop means is adjustable.

28. An apparatus for causing a blowout of a tire of a vehicle comprising:
a fluid powered ram;
a cutting means, operably associated with said ram; and
a control valve means, located in said vehicle adjacent a driver's seat thereof, for controlling flow of power fluid to said ram so that said cutting means can be engaged with said tire in response to operation of said control valve means by the driver of the vehicle, while said tire rotates relative to said cutting means.

29. A method of effectuating a blowout of a tire of a vehicle at any desired location and time in order to simulate alleged causes of vehicular accidents, which comprises:
operating the vehicle at a desired location and speed; and
slicing a sidewall of the tire, from within the vehicle, on a line that forms a circle that is substantially concentric with the tire, by engaging a cutting member with said tire as said tire rotates relative to said cutting member.

30. The method of claim 29, wherein said slicing step is performed by:
orienting said cutting member in a fixed position radially outward from and approximately parallel to a rim of a wheel of the tire; and
pressing said cutting member against the sidewall of the tire as the tire rotates relative thereto until the tire opens.

31. The method of claim 30, further comprising the step of:
supplying power to press said cutting member against the tire.

32. The method of claim 30, comprising the step of:
regulating an amount of force exerted on the tire by said cutting member so that an amount of time it takes said cutting member to slice the tire open and effectuate the blowout can be varied.

* * * * *